(12) United States Patent
Ohruh

(10) Patent No.: US 9,434,208 B2
(45) Date of Patent: Sep. 6, 2016

(54) OMNIDIRECTIONAL WHEEL

(71) Applicant: NEW LIVE, Betschdorf (FR)

(72) Inventor: Michel Ohruh, Betschdorf (FR)

(73) Assignee: NEW LIVE, Bethschdorf (FR)

( * ) Notice: Subject to any disclaimer, the term of this patent is extended or adjusted under 35 U.S.C. 154(b) by 0 days.

(21) Appl. No.: 14/405,678

(22) PCT Filed: Jun. 12, 2013

(86) PCT No.: PCT/FR2013/051371
§ 371 (c)(1),
(2) Date: Dec. 4, 2014

(87) PCT Pub. No.: WO2013/186489
PCT Pub. Date: Dec. 19, 2013

(65) Prior Publication Data
US 2015/0165818 A1    Jun. 18, 2015

(30) Foreign Application Priority Data

Jun. 12, 2012 (FR) .................................... 12 55494

(51) Int. Cl.
*B60B 19/00* (2006.01)
*B60B 19/12* (2006.01)

(52) U.S. Cl.
CPC ............ *B60B 19/003* (2013.01); *B60B 19/12* (2013.01); *B60B 2380/14* (2013.01); *B60B 2380/60* (2013.01); *B60B 2380/62* (2013.01); *B60B 2380/64* (2013.01); *B60B 2900/551* (2013.01)

(58) Field of Classification Search
CPC ..... B60B 19/00; B60B 19/12; B60B 19/003; B60B 2900/551; B60B 2380/60

USPC .......................................................... 301/5.23
See application file for complete search history.

(56) References Cited

U.S. PATENT DOCUMENTS

| 2005/0134106 A1 | 6/2005 | Guile |
| 2006/0076822 A1* | 4/2006 | Lamprich ................ A61G 5/02 301/5.23 |
| 2011/0233989 A1 | 9/2011 | Takenaka et al. |
| 2012/0019048 A1* | 1/2012 | Mckinnon ............... B60B 19/12 301/5.23 |

FOREIGN PATENT DOCUMENTS

| DE | 2011053903 A1 * | 3/2011 |
| EP | 0556401 A1 | 8/1993 |
| NL | 1015676 C2 | 5/2001 |

* cited by examiner

*Primary Examiner* — S. Joseph Morano
*Assistant Examiner* — Jean Charleston
(74) *Attorney, Agent, or Firm* — Andrew W. Chu; Craft Chu PLLC

(57) ABSTRACT

The present invention relates to an omnidirectional wheel including a central hub; and a tread peripherally mounted on the central hub. The tread includes the juxtaposition of wheels or sleeves arranged along radial planes. The wheel also includes spokes connected, two-by-two, via a shaft section. The shaft section is coaxial to the hub, which has a round cross-section, and onto which freely rotatable rings are fitted. The shaft section includes struts inserted between each ring and shaped such that rings remain in a radial position. The shaft section also includes a series of a plurality of abutting tubular segments. The invention further relates to a module for assembling an omnidirectional wheel.

7 Claims, 3 Drawing Sheets

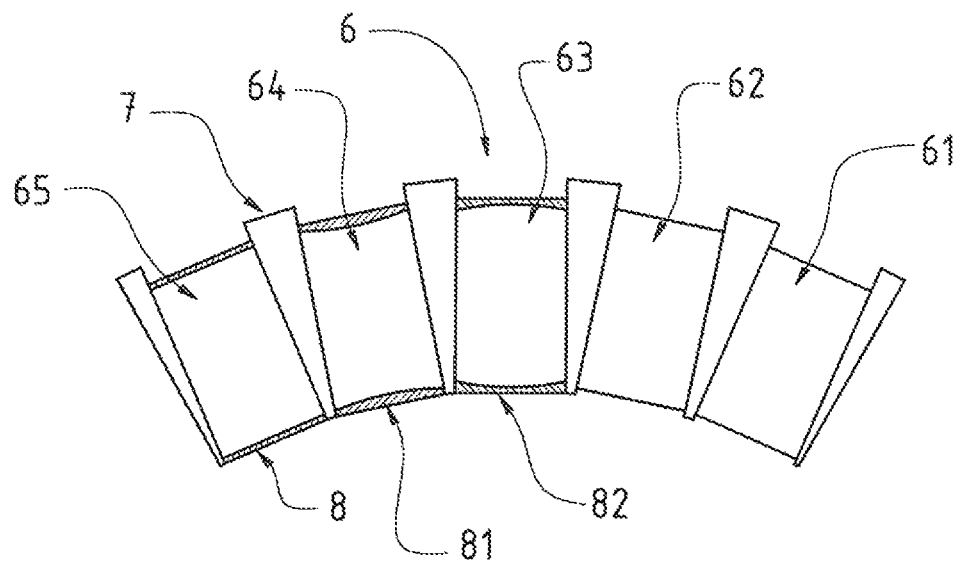
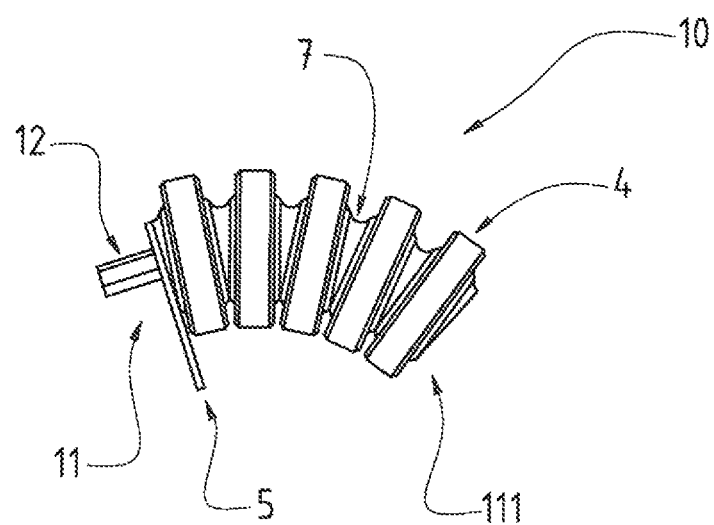

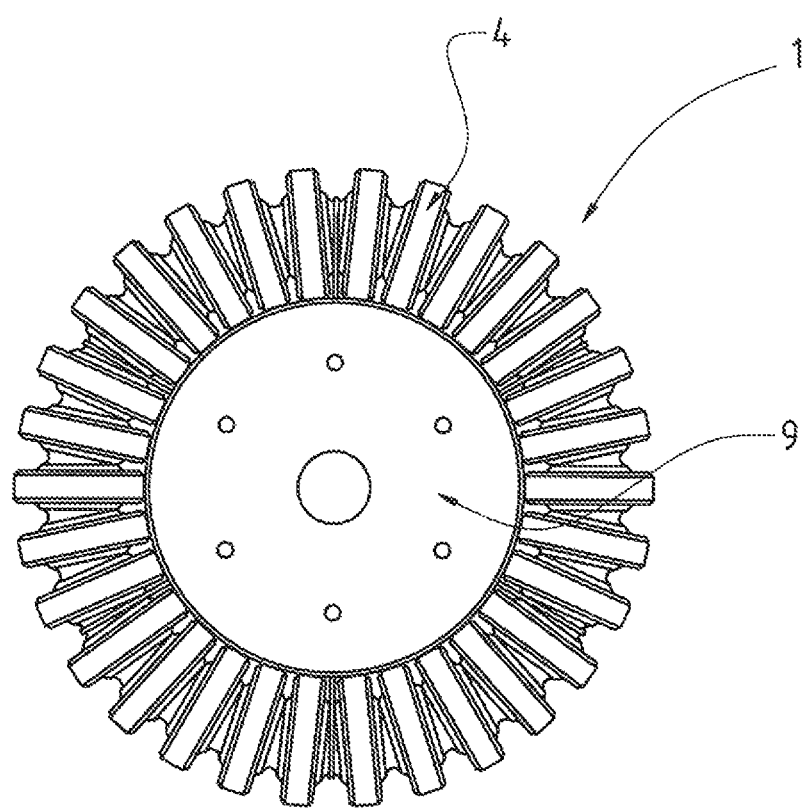

OMNIDIRECTIONAL WHEEL

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of rolling equipment.

The present invention will namely find a particularly advantageous application in the field of wheelchairs for people having limited physical mobility.

However, the invention can also be used in other areas than wheelchairs.

The invention relates more particularly to an omnidirectional wheel aimed at being mounted namely on a wheelchair in order to permit a mobility thereof in all directions.

2. Description of Related Art Including Information Disclosed Under 37 CFR 1.97 and 37 CFR 1.98

A traditional wheel comprises, on the one hand, at its center a hub, which permits to ensure the guiding in rotation of the wheel relative to its support, such as a frame or an arm, and, on the other hand, at the periphery a rim on which is fixed a tread or a tire, which acts as a rolling surface.

The rotation of a wheel permits a mobility thereof, which is easy in a direction that is perpendicular to the axis of rotation of the wheel. However, a displacement of the wheel in a direction parallel to the axis of rotation is not practical, because of the frictions of the ground on the rolling surface of the wheel.

Wheelchairs require more particularly the presence of multidirectional wheels, which permit a smooth multidirectional mobility, so as to facilitate the displacements for the user of said chair.

Thus, in the state of the art are already known wheelchairs having a plurality of casters having an axis of rotation perpendicular to the axis of rotation of the wheel, whereby said casters can namely be mounted at the level of the circumference of the wheel. This system permits a lateral displacement of the wheel, thanks to the casters, thus reducing the frictions on the tread surface of the wheel.

Such a system has however drawbacks. In particular, the wheels associated with casters have a high complexity and, therefore, difficulties in assembling and an expensive manufacture. On the other hand, in order to permit a regular and smooth rolling, the casters must be mounted at least two-by-two. Another drawback of the use of the casters resides in that they lack flexibility in their tread and they are not suitable for a displacement of the wheelchair on uneven ground; thus, the user of said chair is limited in his displacements to roads having only little roughness.

Some patent documents also evoke the placing of sleeves arranged at the level of the circumference of the wheel, said sleeves forming a regular tread that should permit a displacement of the front wheel backwards and laterally, without any constraint due to frictions on the ground.

For example, the use of sleeves is disclosed in the American patent US 2008/018167. However, the sleeves as mentioned in this document have inevitably a compression at the level of their portion located proximate the wheel rim. This makes the rotation of the sleeve and, hence, the lateral displacement of the wheelchair more difficult. Such a system is thus not optimal for solving the problem of a multidirectional displacement of a wheelchair.

The same applies in the patent NL 1 015 676, which discloses a wheel for skates with casters of the "roller" type including a plurality of rollers, the latter being mounted so that a contact pressure is exerted between two adjacent rollers, resulting into a braking of the rotation of said rollers.

In this document, the side surfaces of the rollers insert against each other under pressure, so that each of the rollers is compressed. This results into a resistance against rotation, said resistance being used to brake the roller skate.

From EP 0556 401 is also known a wheel for a wheelchair including a plurality of auxiliary wheels. The auxiliary wheels include a shaft between two bearings comprising an inclined stop permitting to maintain the auxiliary wheels radially, the bearings being connected to the hub of the main wheel.

This system has the advantage of avoiding the compression constraints existing in the other devices of the prior art.

However, maintaining the wheel by means of only the bearings does not permit an optimal rigidity and strength of the system. In addition, the rotation of the auxiliary wheels about their respective shafts can also be subjected to friction constraints, which inevitably leads to difficulties in the lateral displacement of the wheel and, hence, a fortiori of the wheelchair.

SUMMARY OF THE INVENTION

The invention provides the possibility of coping with the various drawbacks of the prior art by providing an omnidirectional wheel including a plurality of rings, mounted freely rotatably on a shaft section, having an optimal mobility in all directions, due to the significant decrease of the friction stresses on the ground.

To this end, the present invention relates to an omnidirectional wheel including a central hub, on which a tread formed of a juxtaposition of wheels or sleeves arranged along radial planes is mounted peripherally. The omnidirectional wheel includes spokes connected, two-by-two, by a shaft section coaxial to the hub and having a round cross-section, on which freely rotating rings are mounted, said shaft section also including struts interposed between each of said rings, said struts being shaped such that said rings remain in a radial position, the shaft section being formed of a series of several abutting tubular segments.

According to another peculiarity of the invention, on the shaft section, between two struts, is mounted a bearing ring aimed at carrying the ring. This bearing ring is preferably shaped so as to match the shape of the wall of the tubular segment.

Interestingly, the hub is formed of two half-rims made integral with each other by enclosing the spokes.

The present invention also relates to a module for assembling an omnidirectional wheel, said module including:
  an abuttable shaft section, which includes at each of its
    ends a coupling stud or a hollow cavity permitting the
    cooperation with a second shaft section;
  a spoke integral with the shaft section;
  braced rings.

Advantageously, the shaft section of the module according to the invention is formed of a series of several abutting tubular segments.

Preferably, said module also includes a bearing ring between the two struts.

The present invention has many advantages. On the one hand, the lateral mobility of the omnidirectional wheel according to the invention is particularly interesting and permits an easy displacement of the wheelchair provided with same in all directions and on all grounds, even those with unevenness, such as gravel or earth roads. On the other hand, the presence of the bearing rings, which can be arranged on the shaft section between two struts, facilitates the rotation of said rings about said shaft section by reducing the frictions, which further improves the mobility of the wheel. Finally, the omnidirectional wheel according to the invention has the advantage of a simple design and a limited cost price. More particularly, the present invention also relates to a module facilitating the assembling of said omnidirectional wheel.

Further features and advantages of the invention will become clear from the following detailed description of non-restrictive embodiments of the invention, with reference to the attached figures.

BRIEF DESCRIPTION OF THE DRAWINGS

FIG. 3 shows a sectional view of different embodiments of the bearing rings that can be mounted on a shaft section of an omnidirectional wheel according to the invention.

FIG. 4 is a front elevation view of a module for assembling an omnidirectional wheel according to the invention.

FIG. 5 shows a complete omnidirectional wheel, in a front elevation view.

DETAILED DESCRIPTION OF THE DRAWINGS

Figure 1:
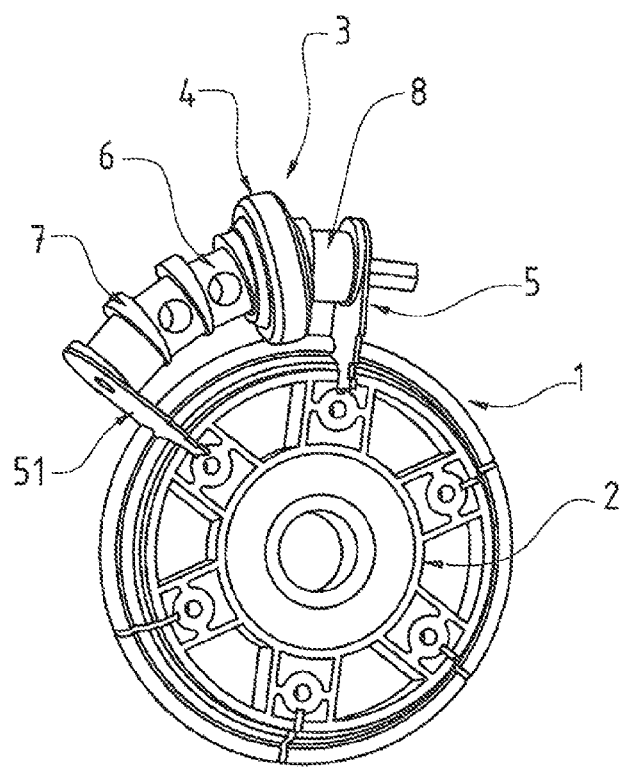
FIG. 1 shows a front perspective view of the omnidirectional wheel according to the invention including a ring mounted on a shaft section.

As shown in FIG. 1, the present invention relates to an omnidirectional wheel 1, which is preferably aimed at being mounted on a wheelchair in order to permit the easy displacement thereof in all directions.

The omnidirectional wheel 1 according to the invention includes, on the one hand, a central hub 2. At the periphery of said hub 2 is peripherally mounted a tread 3 formed of a juxtaposition of wheels or sleeves, preferably rings 4, arranged along radial planes.

More particularly, the omnidirectional wheel 1 according to the present invention also includes spokes, namely with reference numeral 5 and 51, mounted on the central hub 2, and connected two-by-two, for example by a shaft section 6.

In the attached FIG. 1, only two spokes 5 and 51 are shown; however, the omnidirectional wheel 1 according to the invention can include a larger number of spokes, for example six spokes mounted radially on the central hub 2, the spokes being connected two-by-two by means of a shaft section 6.

Said shaft portion 6, as visible in particular in FIG. 1, is coaxial to the central hub 2 and has a round cross-section, so as to permit an insertion of a plurality of rings 4, which are then freely rotating about said shaft section 6.

Figure 2A:
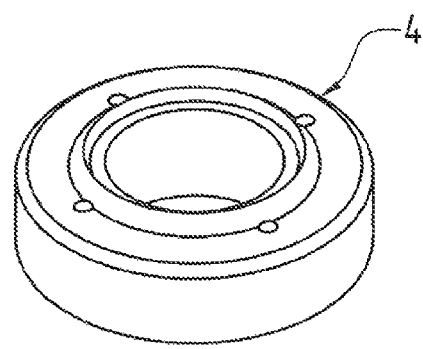
FIGS. 2A and 2B are perspective and top plan views, respectively, each showing a ring that can be used for being mounted on the shaft section of the wheel according to the invention.
Figure 2B:
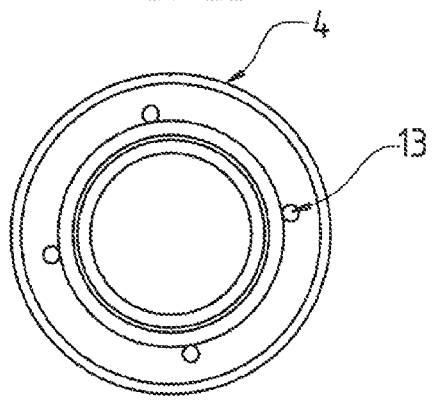

The rings 4 used on the omnidirectional wheel according to the invention are illustrated in the attached FIGS. 2A and 2B.

Said rings 4 aimed at being inserted onto a shaft section 6 of a wheel 1 according to the invention preferably include at least one orifice 13, and preferably a plurality of orifices 13. The latter advantageously permit a distance between said rings, so as to facilitate their insertion onto the shaft section 6.

The presence of these rings 4, which are preferentially made of an elastomeric material that confers them a certain flexibility, permits a complete mobility of the wheelchair provided with omnidirectional wheels 1 according to the present invention.

Indeed, the wheel 1 itself permits a mobility of the chair from the front to the rear, i.e. in a direction perpendicular to the axis of rotation of the central hub 2.

In addition, thanks to the features of the present wheel 1, which will be detailed below, the rings 4, through their rotation about the shaft section 6, permit, in turn, a mobility of the chair in the directions other than the direction perpendicular to the axis of the hub 2.

Preferably, the shaft section 6 also comprises struts 7, which are interposed between each of the rings 4 inserted onto said shaft section 6. Said struts 7 are namely shaped so as to permit to maintain the rings 4 in a radial position.

Such maintaining namely permits to avoid compressing the rings 4 and thus to facilitate the rotation of the latter for a smooth displacement of the omnidirectional wheel 1 in all directions.

In order to maintain the rings 4 in a radial position, the struts 7 preferably have a wider portion at the level of the arc of a circle of the shaft section 6, which is opposite the central hub 2, and a narrower portion on the side of the shaft section 6 near said hub 2. Such an embodiment is namely illustrated in the attached FIGS. 1 and 3.

Turning back now to the shaft section 6, the latter is preferably formed of a series of abutting tubular segments 61 to 65, namely shown in the attached FIG. 3.

Thus, at the level of each bearing existing between two adjacent tubular segments, for example 61 and 62, a strut 7 is arranged so as to maintain the rings 4 in a radial position.

Such a shaping, including a plurality of tubular segments 61 to 65, also permits an easier rotation of the rings 4 about the shaft section 6, so as to permit a smooth displacement of the omnidirectional wheel 1 according to the invention, and this in all directions.

In FIG. 3 is also visible that the outer wall of a tubular segment 61 or 65 can either be straight or be convex, or even be concave. This outer wall can also have other shapes, such as a shape of grooves or waves.

According to a particularly advantageous exemplary embodiment of the invention, the omnidirectional wheel 1 also includes a bearing ring 8, mounted between two struts 7, and on which a ring 4 rests.

It is understood that each of the rings 4 of the omnidirectional wheel 1 can preferably be mounted on a bearing ring 8. However, it can also be considered that only part of the rings 4 are mounted on a bearing ring 8.

The bearing ring 8 is shaped so as to match the shape of the wall of the tubular segment 61 to 65 wherein said ring 8 is mounted. A schematic representation of the possible shaping of the bearing rings 8, 81 and 82 is visible in FIG. 3, when the wall of the tubular segment is straight, concave or convex, respectively.

The bearing ring 8, 81 or 82 preferably includes a slot permitting to facilitate the insertion of said ring 8, 81 or 82 onto a tubular segment 65, 64 and 63, respectively, of the shaft section 6.

The presence of this bearing ring 8, 81 or 82 between a ring 4 and the shaft section 6, between two struts 7, advantageously favors the sliding and therefore the rotation of said ring 4 about the section 6.

Turning back now to the central hub 3 of the omnidirectional wheel 1, it is advantageously formed of two half-rims, which are preferably made integral with each other, so as to enclose the spokes 5, 51.

One of the two half-rims 9 is visible namely in the attached FIG. 5, the latter representing a complete omnidirectional wheel according to the invention having a plurality of rings 4 on the entire circumference of said wheel 1.

The present invention also relates to a module 10 for assembling an omnidirectional wheel according to the invention. Such a module 10 is shown in the attached FIG. 4.

The module 10 according to the invention includes, in a first stage, a shaft section 6, not visible in FIG. 4, which can be in abutment against a second shaft section.

The shaft section 6 comprises, at each of its ends 11 and 111, a coupling stud 12 or a hollow cavity, not shown in FIG. 4, permitting advantageously the cooperation of said section 6 with a second shaft section of a second module.

Thus, the shaft section 6 can include, at each of its ends 11 and 111, a coupling stud 12. The adjacent shaft sections must then include a hollow cavity at their end cooperating with the section 6.

According to another embodiment, the shaft section 6 comprises, at each of its ends 11 and 111, a hollow cavity. In this very case, the coupling stud 12 can be an applied part independent from the module 10. It is also possible that the shaft sections of the adjacent modules include coupling studs at their end cooperating with said shaft section 6.

According to a preferred embodiment, which is the one shown in FIG. 4, at one of its ends 11, said section 6 includes a coupling stud 12; at the opposite end 111, said section 6 includes a hollow cavity. Thus, in a particularly advantageous way, the coupling stud 12 of a shaft section can cooperate with a hollow recess of a second section, thus maintaining two adjacent segments 6 integral with each other.

Advantageously, the coupling stud and/or the hollow cavity also has a function of impeding the rotation of the shaft sections 6 relative to each other when they are assembled so as to form an omnidirectional wheel 1 according to the invention.

The shaft section 6 of the module 10 according to the invention is preferably formed of a plurality of tubular segments, not visible in FIG. 4.

The module 10 according to the invention also includes a spoke 5, integral with the shaft section 6, and aimed at being mounted on a hub 2. In FIG. 4, the spoke 5 is integral, at the level of the end 11 of the section 6 including the coupling stud 12. However, such an embodiment should not to be considered as limiting the module 10 according to the invention; indeed, the spoke 5 can also be integral with the end 111 of said section 6.

Finally, the module 10 for assembling the omnidirectional wheel 1 includes rings 4 preferably made of elastomeric material, two rings 4 being separated by a strut 7.

According to an interesting embodiment, the module 10 according to the invention also includes a bearing ring 8 mounted between two struts 7, said ring 8 bearing a ring 4 and facilitating the rotation thereof about the shaft section 6 of the module 10.

Said module 10 according to the invention permits to assemble, particularly easily and quickly, the omnidirectional wheel 1 according to the invention.

Indeed, in a first phase, an appropriate number of modules 10 according to the invention are mounted on a central hub 2, by means of spokes 5.

Preferably, then the two half-rims are placed and they are made integral with each other, so as to bring closer and enclose the spokes 5.

A complete omnidirectional wheel 1 as shown in the attached FIG. 5 is then obtained, which permits a displacement of a wheelchair provided with a plurality of omnidirectional wheels 1, in all directions and without any difficulty.

I claim:

1. An omnidirectional wheel, comprising:
   a central hub having a radial plane; and
   a tread mounted peripherally on said central hub, said tread comprising:
   a plurality of shaft sections, each shaft section being comprised of a tubular segment, each tubular segment being aligned along a respective radius of said radial plane of said central hub and having a round cross-section;
   spokes connected on at least two tubular segments of respective shaft sections, each spoke being aligned along another respective radius of said radial plane of said central hub;
   freely rotatable rings inserted onto said shaft sections, each rotatable ring being rotatable around a respective tubular segment in a direction aligned along the respective radius of said radial plane of said central hub corresponding to said respective tubular segment; and
   struts interposed between adjacent rotatable rings and inserted onto said shaft sections, said struts engaging each tubular segment so as to hold each rotatable ring in said direction aligned along the respective radius of said radial plane of said central hub corresponding to said respective shaft section.

2. The omnidirectional wheel, according to claim 1, further comprising:
   a bearing ring mounted on a respective tubular segment of said shaft section and between a respective rotatable ring and said respective tubular segment.

3. The omnidirectional wheel, according to claim 2, wherein said bearing ring has a surface matching a wall of said respective tubular segment.

4. The omnidirectional wheel, according to claim 1, wherein said central hub comprises two half-rims made integral with each other, and wherein at least one spoke is partially enclosed by said two half-rims.

5. A module for assembling an omnidirectional wheel according to claim 1, said module comprising:
   at least one shaft section being comprised of a tubular segment with a first end and a second end, a coupling stud at said first end, and a hollow cavity at said second end, said coupling stud and said hollow cavity being in a male-female connection relationship with adjacent shaft sections;
   a respective spoke integral with said at least one shaft section; and a respective rotatable ring inserted on said at least one shaft section and being rotatable around said at least one shaft section.

6. The module, according to claim 5, further comprising: another shaft section, wherein respective tubular segments abut each other.

7. The module, according to claim 5, further comprising a bearing ring mounted on said at least one tubular segment of said shaft section and between a respective rotatable ring and said at least one tubular segment.

* * * * *